United States Patent
Sugaya

(10) Patent No.: US 10,430,145 B2
(45) Date of Patent: Oct. 1, 2019

(54) REMOTE TERMINAL, METHOD OF REMOTE INSTRUCTION

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 319 days.

(21) Appl. No.: 15/049,196

(22) Filed: Feb. 22, 2016

(65) Prior Publication Data

US 2017/0131960 A1  May 11, 2017

(30) Foreign Application Priority Data

Nov. 10, 2015 (JP) .................................. 2015-220776

(51) Int. Cl.
| | | |
|---|---|---|
| *G06F 3/14* | (2006.01) | |
| *H04N 13/204* | (2018.01) | |
| *G06F 3/0481* | (2013.01) | |
| *H04N 1/00* | (2006.01) | |
| *H04N 1/32* | (2006.01) | |
| *G06F 3/0484* | (2013.01) | |

(52) U.S. Cl.
CPC ........ *G06F 3/1454* (2013.01); *G06F 3/04815* (2013.01); *G06F 3/04817* (2013.01); *H04N 1/00307* (2013.01); *H04N 1/32117* (2013.01); *H04N 1/32144* (2013.01); *H04N 13/204* (2018.05); *G06F 3/04845* (2013.01); *H04N 2201/3245* (2013.01); *H04N 2201/3253* (2013.01); *H04N 2201/3273* (2013.01)

(58) Field of Classification Search
None
See application file for complete search history.

(56) References Cited

U.S. PATENT DOCUMENTS

| | | | |
|---|---|---|---|
| 9,940,750 B2* | 4/2018 | Dillavou | ............... G06T 19/006 |
| 9,959,629 B2* | 5/2018 | Dillavou | .................. G06T 7/20 |
| 2007/0184422 A1* | 8/2007 | Takahashi | .............. G06Q 50/20 |
| | | | 434/262 |
| 2008/0225007 A1* | 9/2008 | Nakadaira | ........... G06F 3/03545 |
| | | | 345/173 |
| 2009/0036902 A1* | 2/2009 | DiMaio | .................... A61B 8/12 |
| | | | 606/130 |
| 2009/0313584 A1* | 12/2009 | Kerr | ........................ G06F 3/012 |
| | | | 715/849 |

FOREIGN PATENT DOCUMENTS

JP   2014-230219 A   12/2014

* cited by examiner

*Primary Examiner* — Tuan S Nguyen
(74) *Attorney, Agent, or Firm* — Lex IP Meister, PLLC

(57) ABSTRACT

The present invention is to provide a remote terminal, and a method of remote instruction to easily understand not only a three-dimensional effect but also a relationship between the screen display and the actual real space. A remote terminal 100 receiving an instruction from an instruction terminal 10 while sharing a screen, takes an image, transmits the taken image to the instruction terminal 10, displays a three dimensional shape to understand three dimensional space of the taken image, and displays an instruction icon received from the instruction terminal 10 for the three dimensional shape.

7 Claims, 10 Drawing Sheets

REMOTE TERMINAL, METHOD OF REMOTE INSTRUCTION

CROSS REFERENCE TO RELATED APPLICATIONS

This application claims priority to Japanese Patent Application No. 2015-220776 filed on Nov. 10, 2015, the entire contents of which are incorporated by reference herein.

TECHNICAL FIELD

The present invention relates to a remote terminal, and a method of remote instruction, receiving an instruction from an instruction terminal while sharing a screen.

BACKGROUND ART

Recently, a screen is shared between a remote terminal operated by a worker and an instruction terminal operated by an instructor by using public line network, such as Internet network. In such a screen sharing, a remote terminal and an instruction terminal share a screen displaying an image taken by a worker, and an instructor inputs a work instruction for the image shared on the screen to provide an appropriate work instruction to the worker on the remote terminal.

For instance, Patent Document 1 discloses that an instructor inputs a work instruction to the instruction terminal and a worker recognizes the work instruction through the trajectory etc. of the work instruction.

CITATION LIST

Patent Literature

Patent Document 1: JP 2014-230219A

SUMMARY OF INVENTION

However, in the constitution of Patent Document 1, when the work instruction input by the instructor is projected with a projector as a work instruction image, there is a problem that it is difficult for the worker to understand a three-dimensional effect and a relationship between the screen display and the actual real space with a flat screen display.

Then, in the present invention, the inventor has paid attention that a three dimensional shape is provided in the sharing a screen, and an arrow is displayed in the three dimensional shape to instruct a worker, who is instructed remotely, toward which direction to be turned and to be advanced.

Accordingly, an objective of the present invention is to provide a remote terminal, and a method of remote instruction to easily understand not only a three-dimensional effect but also a relationship between the screen display and the actual real space.

According to the first aspect of the present invention, a remote terminal receiving an instruction from an instruction terminal while sharing a screen, includes:
 a camera unit that takes an image;
 an image transmitter unit that transmits the taken image to the instruction terminal;
 a display unit that displays a three dimensional shape to understand three dimensional space of the taken image; and
 an icon display unit that displays an instruction icon received from the instruction terminal for the displayed three dimensional shape.

According to the first aspect of the present invention, a remote terminal receiving an instruction from an instruction terminal while sharing a screen, takes an image, transmits the taken image to the instruction terminal, displays a three dimensional shape to understand three dimensional space of the taken image, and displays an instruction icon received from the instruction terminal for the displayed three dimensional shape.

The first aspect of the invention falls into the category of a remote terminal, but the categories of a method of remote instruction, etc., have the same functions and effects.

According to the second aspect of the present invention, the remote terminal according to the first aspect of the present invention, in which the instruction icon displayed by the icon display unit is an arrow icon that instructs the movement or the rotation of the remote terminal, the remote terminal further includes:
 a location detecting unit that detects a current location of the remote terminal; and
 an estimating unit that estimates a beginning point of the arrow icon based on the location information detected by the location detecting unit.

According to the second aspect of the present invention, the remote terminal according to the first aspect of the present invention, in which the instruction icon displayed by the icon display unit is an arrow icon that instructs the movement or the rotation of the remote terminal, the remote terminal further detects a current location of the remote terminal, and estimates a beginning point of the arrow icon based on the location information detected by the location detecting unit.

According to the third aspect of the present invention, the remote terminal according to the first aspect of the present invention, in which the instruction icon displayed by the icon display unit is an arrow icon that instructs the movement or the rotation of the remote terminal, the remote terminal further includes:
 a location detecting unit that detects a current location of the remote terminal; and
 a location information associating unit that associates and stores the location information detected by the location detecting unit with an end point of the arrow icon.

According to the third aspect of the present invention, the remote terminal according to the first aspect of the present invention, in which the instruction icon displayed by the icon display unit is an arrow icon that instructs the movement or the rotation of the remote terminal, the remote terminal further detects a current location of the remote terminal, and associates and stores the location information detected by the location detecting unit with an end point of the arrow icon.

According to the fourth aspect of the present invention, a method of providing remote instruction by receiving an instruction from an instruction terminal while sharing a screen, includes the steps of
 taking an image;
 transmitting the taken image to the instruction terminal;
 displaying a three dimensional shape to understand three dimensional space of the taken image; and
 displaying an instruction icon received from the instruction terminal for the displayed three dimensional shape.

The present invention can provide a remote terminal, and a method of remote instruction to easily understand not only a three-dimensional effect but also a relationship between the screen display and the actual real space.

DESCRIPTION OF EMBODIMENTS

Embodiments of the present invention are described below with reference to the attached drawings. However, this is illustrative only, and the technological scope of the present invention is not limited thereto.
Outline of Remote Instruction System 1

Figure 1:
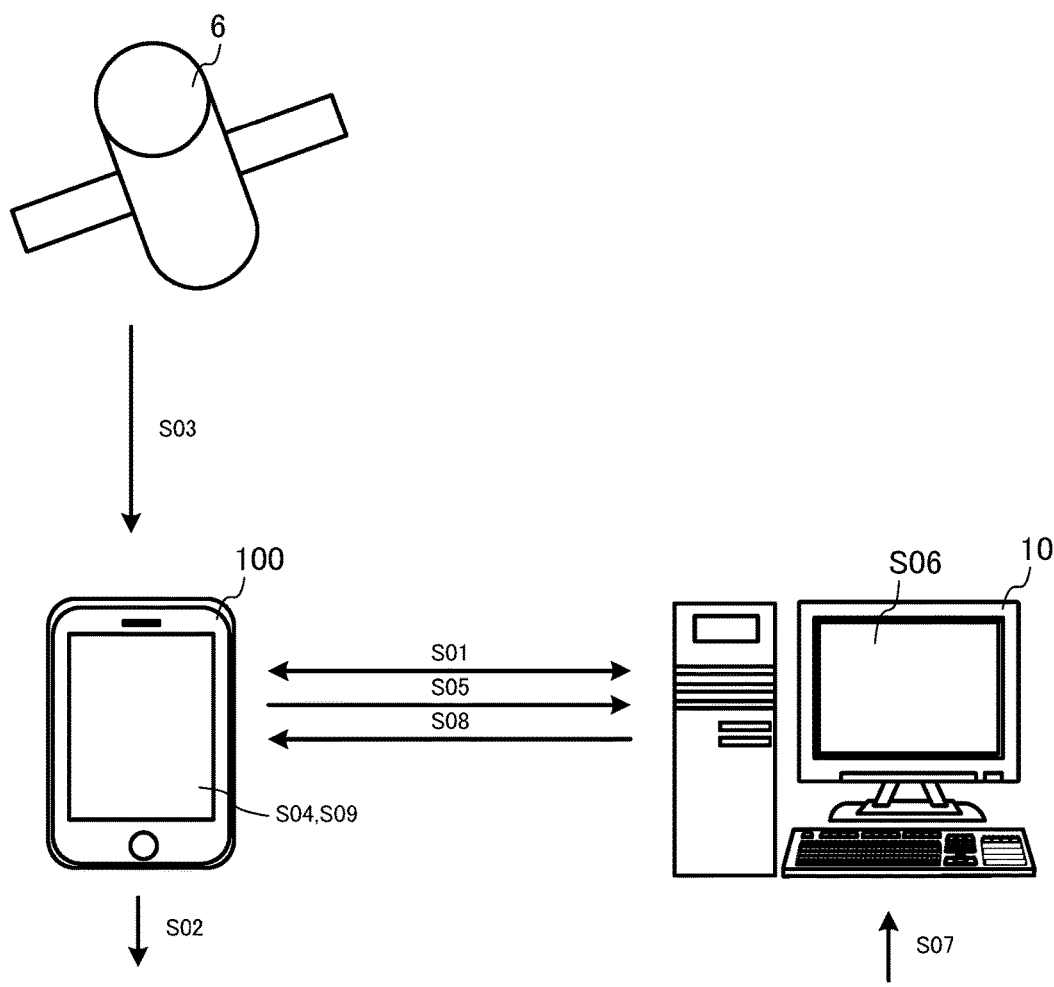
FIG. 1 is a schematic diagram of the remote instruction system 1.

The outline of the present invention is described based on FIG. 1. FIG. 1 shows the overall view of a remote instruction system 1 according to a preferred embodiment of the present invention. The remote instruction system 1 includes a remote terminal 100, an instruction terminal 10, and GPS 6. The number of the remote terminal 100 and the instruction terminal 10 is not limited to one and may be more than one.

The remote terminal 100 is an electrical appliance or a wearable terminal with a data communication function and a camera functions, etc. Examples of the remote terminal 100 include information appliances such as a mobile phone, a mobile terminal, a personal computer, a net book terminal, a slate terminal, an electronic book terminal, and a portable music player, and a wearable terminal such as a glasses type terminal, and a head mounted display.

Moreover, the instruction terminal 10 is electrical appliances with a data communication function, etc. The instruction terminal 10 is electrical appliances and terminal device of the unredeemable type similar to remote terminal 100.

Moreover, GPS 6 is general GPS. The remote terminal 100 may acquire its own location information according to the methods other than GPS 6, and in this case, GPS 6 is not structurally needed.

First, the remote terminal 100 and the instruction terminal 10 establish a network connection necessary for screen sharing (step S01).

The remote terminal 100 takes an image of a working area where a worker works (step S02).

The remote terminal 100 acquires its own location information from GPS 6 (step S03).

The remote terminal 100 displays the image of the working area and then displays a three dimensional shape in the displayed image to understand three dimensional space (step S04). In step S04, the remote terminal 100 displays a solid having height, depth, and width, such as cube, cuboid, or other solid as a three dimensional shape.

The remote terminal 100 transmits the image data of the imaged working area and the three dimensional shape data to the instruction terminal 10 (step S05).

The instruction terminal 10 receives the image data and the three dimensional shape data, and displays the image and the three dimensional shape on itself (step S06).

The instruction terminal 10 receives an input from the instructor (step S07). In step S07, the instruction terminal 10 receives the input of a message and an input of a work instruction. The instruction terminal 10 receives the input of an arrow as an input of a work instruction. The arrow represents an icon visually displaying a direction and a distance, etc. that the worker should move or turn.

The instruction terminal 10 recognizes a beginning point, an end point, and the direction of the input arrow, and transmits the recognized data to the remote terminal 100 as arrow data (step S08).

The remote terminal 100 receives the arrow data, and estimates and decides the location information of the beginning point of the arrow. When a beginning point is decided, the remote terminal 100 estimates the location information acquired in step S03 as the beginning point. Moreover, based on the arrow data, the remote terminal 100 decides the end point and the direction of the arrow using the estimated beginning point.

The remote terminal 100 displays the arrow icon in the three dimensional shape based on the beginning point, the end point, and the direction of the decided arrow (step S09).
System Configuration of Remote Instruction System 1

Figure 2:
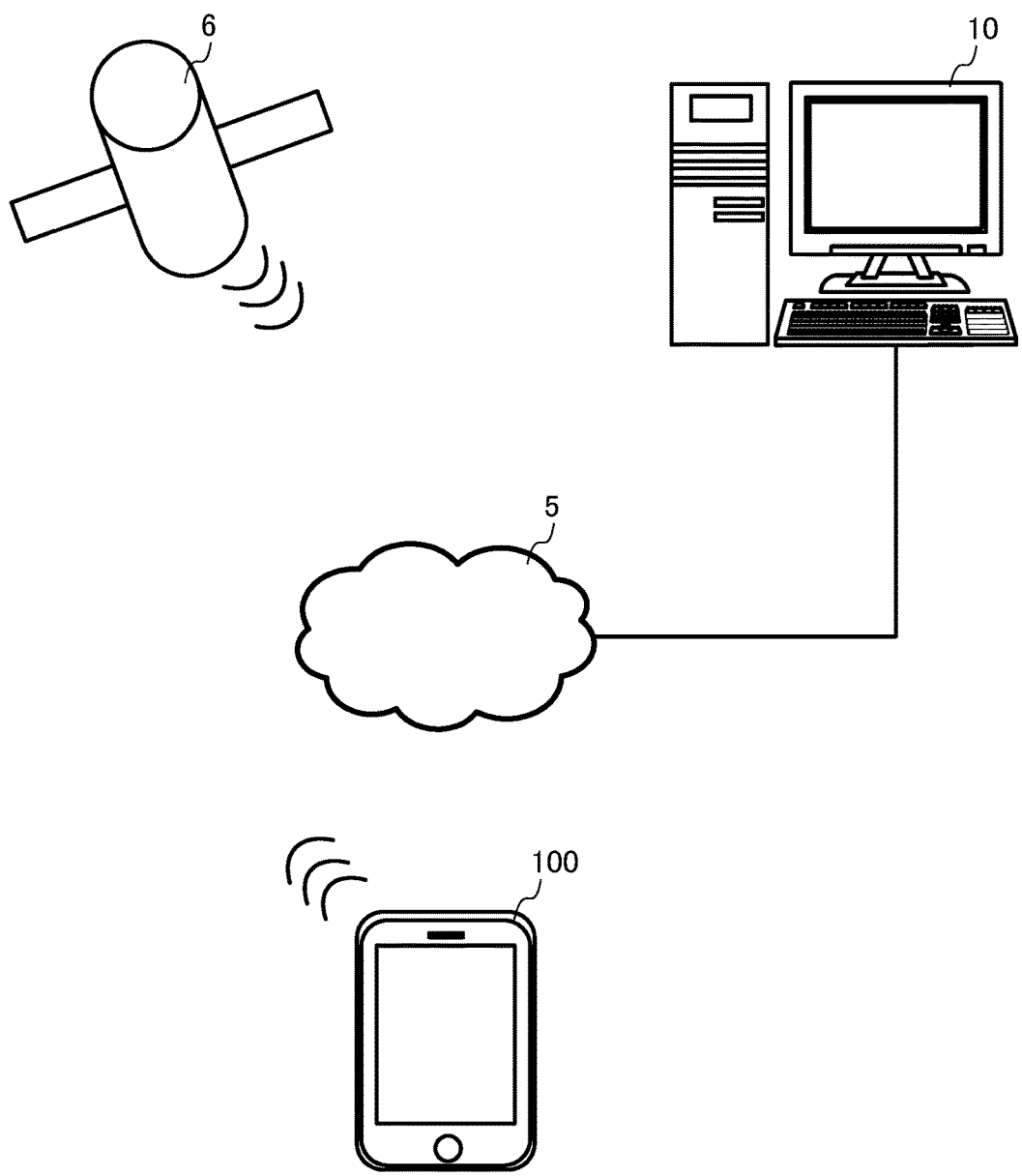
FIG. 2 is an overall configuration diagram of the remote instruction system 1.

The system configuration of the remote instruction system 1 is described based on FIG. 2. FIG. 2 shows a system configuration diagram of the remote instruction system 1 according to a preferred embodiment of the present invention. The remote instruction system 1 includes an instruction terminal 10, a remote terminal 100, and a public line network 5 (e.g. the Internet network, a third and a fourth generation networks), and GPS 6. In the remote instruction system 1, the instruction terminal 10 may be connected with the remote terminal 100 through a server device. In this case, the instruction terminal 10 and the remote terminal 100 may execute various data communications through a server device.

The remote terminal 100 has functions to be described later and a capability of data communication, which is an electronical appliance and wearable terminal described above.

The instruction terminal 10 has functions to be described later and a capability of data communication, which is an electronical appliance or a terminal device of the unredeemable type described above.

GPS 6 is general GPS.
Functions

Figure 3:
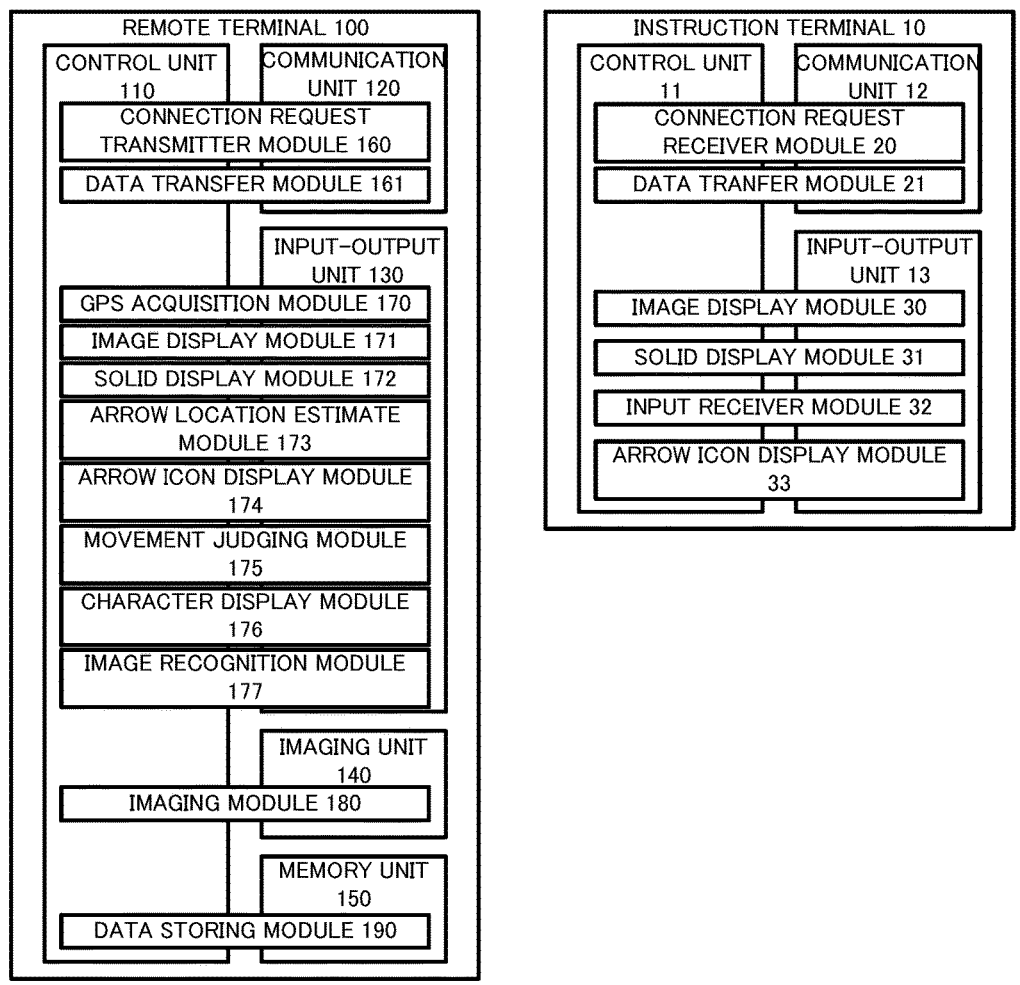
FIG. 3 is a functional block diagram of the instruction terminal 10 and the remote terminal 100.

The structure of each device will be described below with reference to FIG. 3. FIG. 3 is a functional block diagram of the instruction terminal 10 and the remote terminal 100 according to a preferable embodiment of the present invention.

The remote terminal 100 includes a control unit 110 such as a central processing unit (hereinafter referred to as "CPU"), random access memory (hereinafter referred to as "RAM"), and read only memory (hereinafter referred to as "ROM") and a communication unit 120 such as a device capable of communicating with other devices, for example a Wireless Fidelity or Wi-Fi® enabled device complying with IEEE 802.11.

The remote terminal 100 also includes an input-output unit 130 including a display unit outputting and displaying data and images that have been processed by the control unit 110; and an input unit such as a touch panel, a keyboard, or a mouse that receives an input from a user. The remote terminal 100 also includes a device capable of acquiring its own location information from GPS 6. The remote terminal 100 also includes an imaging unit 140 such as an imaging device taking still and moving images, etc., and a lens. The remote terminal 100 also includes a memory unit 150 such as a hard disk, a semiconductor memory, a recording medium, or a memory card to store data.

In the remote terminal 100, the control unit 110 reads a predetermined program to run a connection request transmitter module 160 and a data transfer module 161 in cooperation with the communication unit 120. Moreover, in the remote terminal 100, the control unit 110 reads a predetermined program to run a GPS acquisition module 170, an image display module 171, a solid display module 172, an arrow location estimate module 173, an arrow icon display module 174, a movement judging module 175, a character display module 176, and an image recognition module 177 in cooperation with the input-output unit 130. Furthermore, in the remote terminal 100, the control unit 110 reads a predetermined program to run an imaging module 180 in cooperation with the imaging unit 140. Furthermore, in the remote terminal 100, the control unit 110 reads a predetermined program to run a data storing module 190 in cooperation with the memory unit 150.

The instruction terminal 10 includes a control unit 11 including a CPU, a RAM, and a ROM; and a communication unit 12 such as a device capable of communicating with other devices, for example, a Wireless Fidelity or Wi-Fi® enabled device complying with IEEE 802.11 in the same way as the remote terminal 100.

The instruction terminal 10 also includes an input-output unit 13 including a display unit outputting and displaying data and images that have been processed by the control unit 11; and an input unit such as a touch panel, a keyboard, or a mouse that receives an input from a user in the same way as the remote terminal 100. The instruction terminal 10 also includes a device capable of acquiring its own location information from GPS in the same way as the remote terminal 100.

In the instruction terminal 10, the control unit 11 reads a predetermined program to run a connection request receiver module 20, a data transfer module 21 in cooperation with the communication unit 12. Moreover, in the instruction terminal 10, the control unit 11 reads a predetermined program to run an image display module 30, a solid display module 31, an input receiver module 32, and an arrow icon display module 33 in cooperation with the input-output unit 13.

Remote Instruction Process

Figure 4:
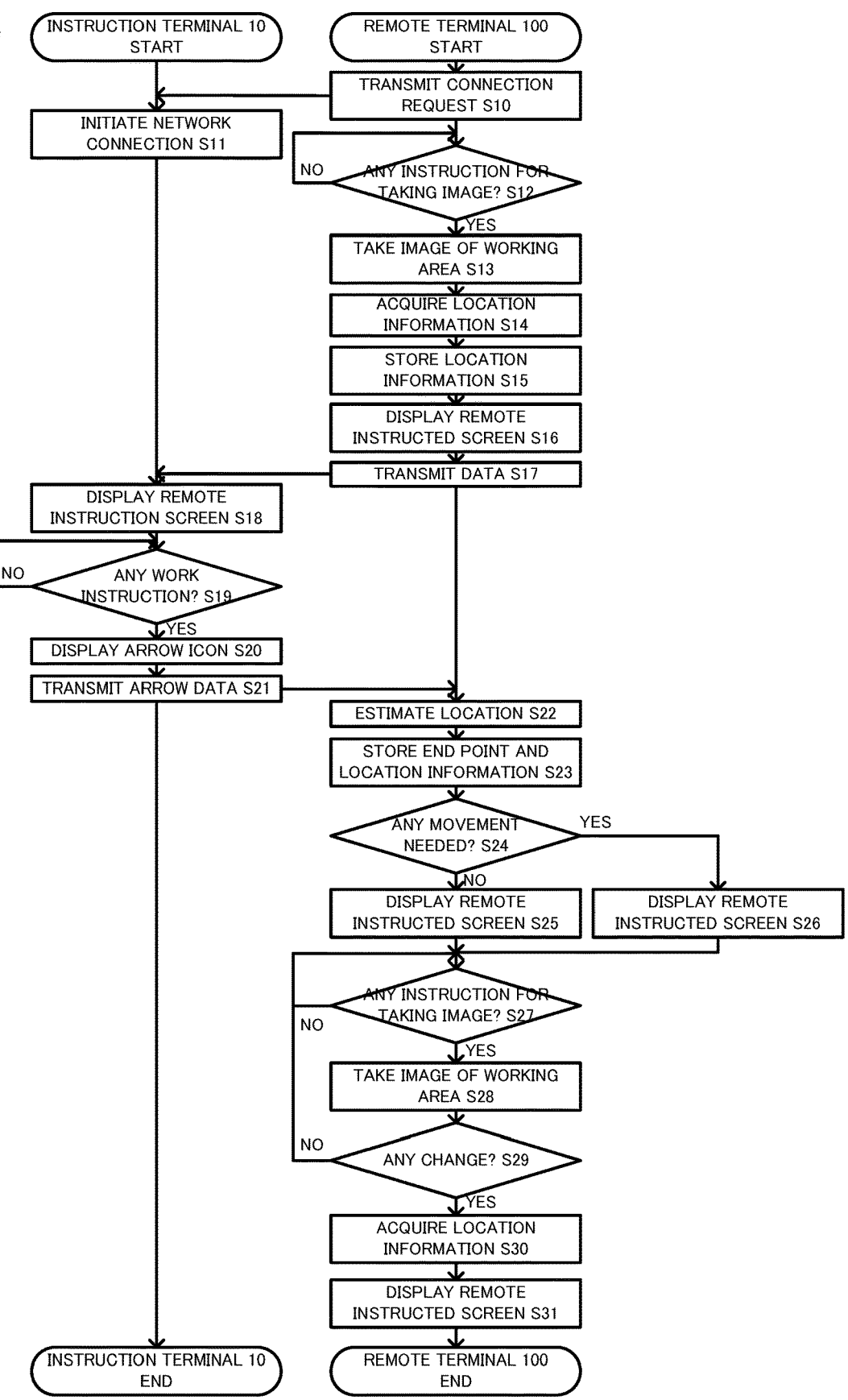
FIG. 4 is a flow chart of the remote instruction process executed by the instruction terminal 10 and the remote terminal 100.

The remote instruction process executed by the remote terminal 100 and the instruction terminal 10 is described based on FIG. 4. FIG. 4 is a flow chart of the remote instruction process executed by the remote terminal 100 and the instruction terminal 10. The tasks executed by the modules of each of the above-mentioned devices will be explained below together with the process.

First, the connection request transmitter module 160 transmits a connection request for screen sharing with the instruction terminal 10 to the instruction terminal 10 (step S10).

The connection request receiver module 20 receives the connection request transmitted from the instruction terminal 10, and initiates a network connection for screen sharing (step S11).

The imaging module 180 judges whether or not the imaging module 180 has received an instruction to take an image of a working area (step S12). In step S12, if judging that the imaging module 180 has not received an instruction to take an image of a working area (NO), the imaging module 180 repeats the process until receiving an instruction to take an image.

On the other hand, if judging that the imaging module 180 has received an instruction to take an image of a working area (YES), the imaging module 180 takes an image of a working area (step S13).

The GPS acquisition module 170 acquires its own location information from GPS 6 (step S14).

The data storing module 190 stores the acquired its own location information (step S15).

Each process in step S14 and step S15 may be executed at the timing described later.

The image display module 171 displays the taken image of the working area, and the solid display module 172 displays the three dimensional shape in the image (step S16). In step S16, the image display module 171 and the solid display module 172 display the remote instructed screen shown in FIG. 5.

Figure 5:
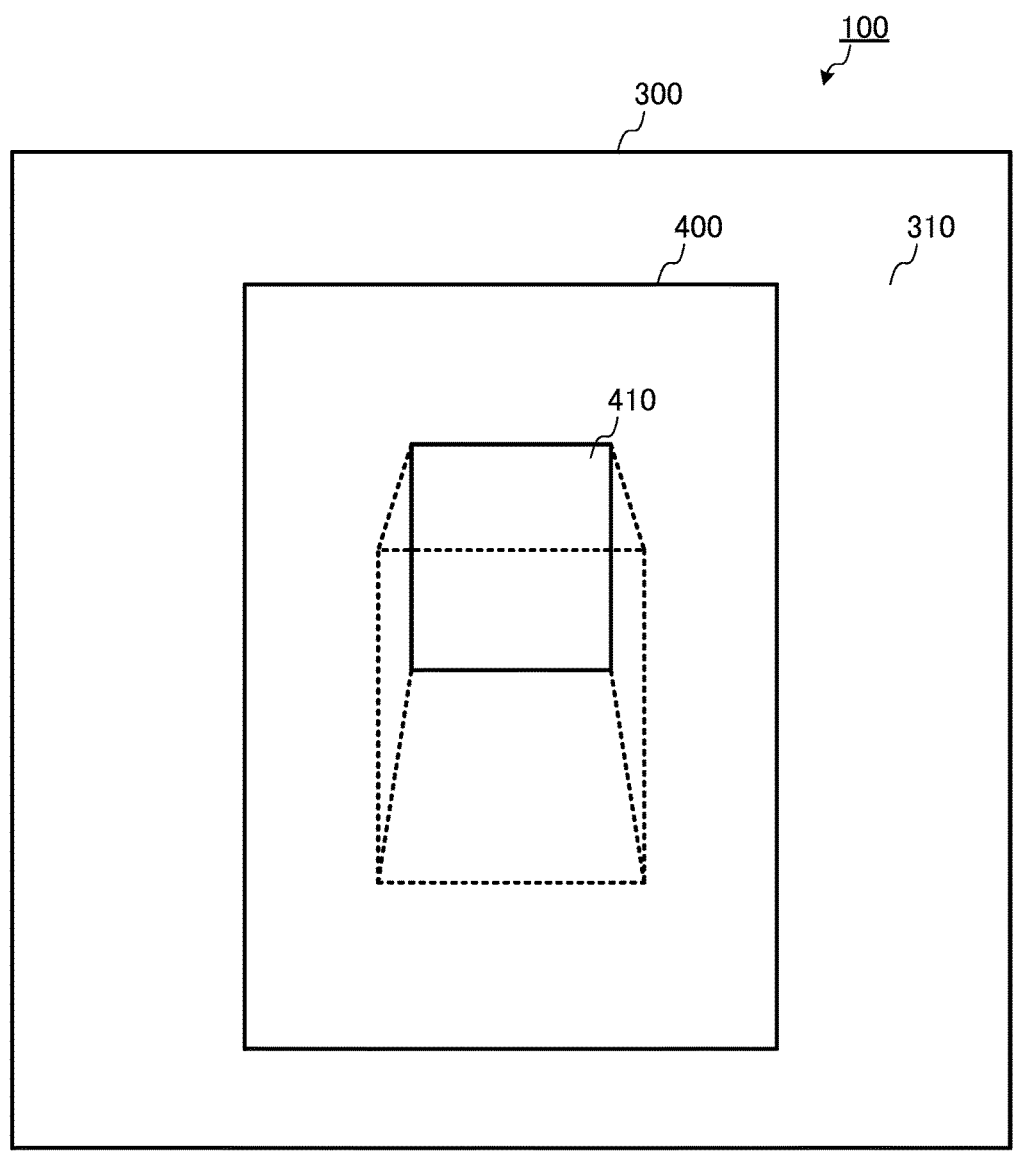
FIGS. 5, 8, 9, and 10 each show a remote instructed screen displayed on the remote terminal 100.

FIG. 5 shows the remote instructed screen displayed on the remote terminal 100. The image display module 171 displays the image 310 in the image display window 300. Moreover, the solid display module 172 displays the solid display window 400 in the image display window 300, and then displays the solid 410 in the solid display window 400. More specifically, the solid display module 172 places and displays the solid 410 on top of the image 310. Moreover, the solid display module 172 displays the solid 410 in parallel to the image display window 300. The solid 410 is displayed as shape of the abbreviation cube.

The shape of the solid displayed by the solid display module 172 is not limited to a cube, and may be a polyhedron, such as cuboid. Moreover, the length of each side of the solid can be changed as appropriate.

The data transfer module 161 transmits an image data and a three dimensional shape data to the instruction terminal 10 (step S17).

The data transfer module 21 receives the image data and the three dimensional shape data transmitted from the remote terminal 100. The image display module 30 displays the remote instruction screen showing the image and the three dimensional shape as shown in FIG. 6 based on the received image data and the three dimensional shape data (step S18).

Figure 6:
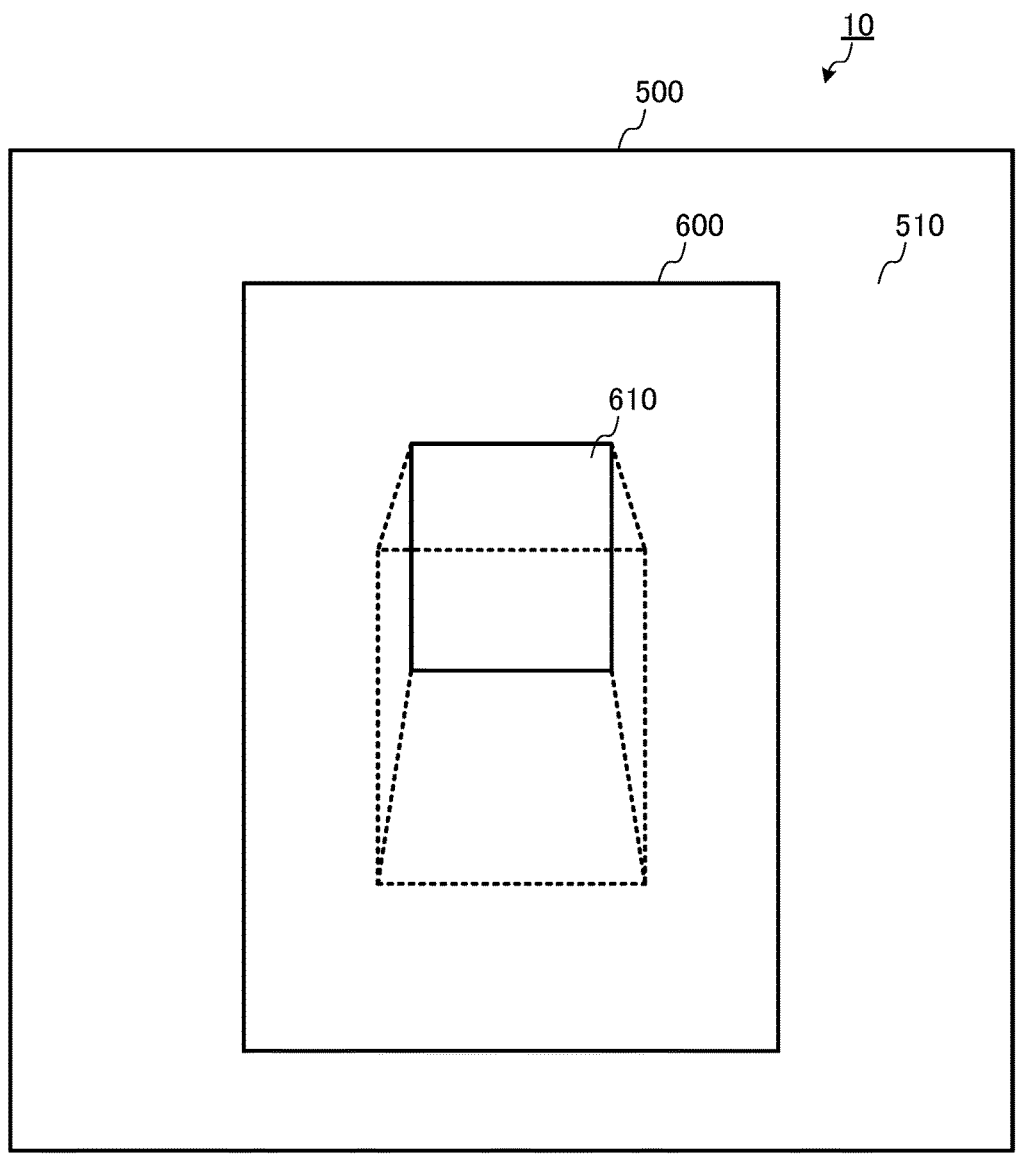
FIGS. 6 and 7 each show a remote instruction screen displayed on the instruction terminal 10.

FIG. 6 shows the remote instruction screen displayed on the instruction terminal 10. The image display module 30 displays the image 510 in the image display window 500. Moreover, the solid display module 31 displays the solid display window 600 in the image display window 500, and displays the solid 610 in the solid display window 600. More specifically, the solid display module 31 places and displays the solid 610 on top of the image 510 in the same way as the remote terminal 100. Moreover, the solid display module 31 displays the solid 610 in parallel to the image display window 500. The solid 610 has a shape similar to the solid 410 mentioned above.

The input receiver module 32 judges whether or not the input receiver module 32 has received the input of the work instruction in the solid 610 (step S19). In step S19, the input of the work instruction received by the input receiver module 32 is an input to instruct movement or rotation of the remote terminal 100. The instructor inputs the arrow, the direction of movement or rotation, as an input of the work instruction. As the input of an arrow, the beginning point and the end point of an arrow may be defined by a numeric value or a point, etc., or it may be defined by dragging the arrow in the solid display window.

In step S19, if judging that the input receiver module 32 has not received an input of the work instruction in the solid 610 (NO), the input receiver module 32 repeats the step until receiving an input.

Figure 7:
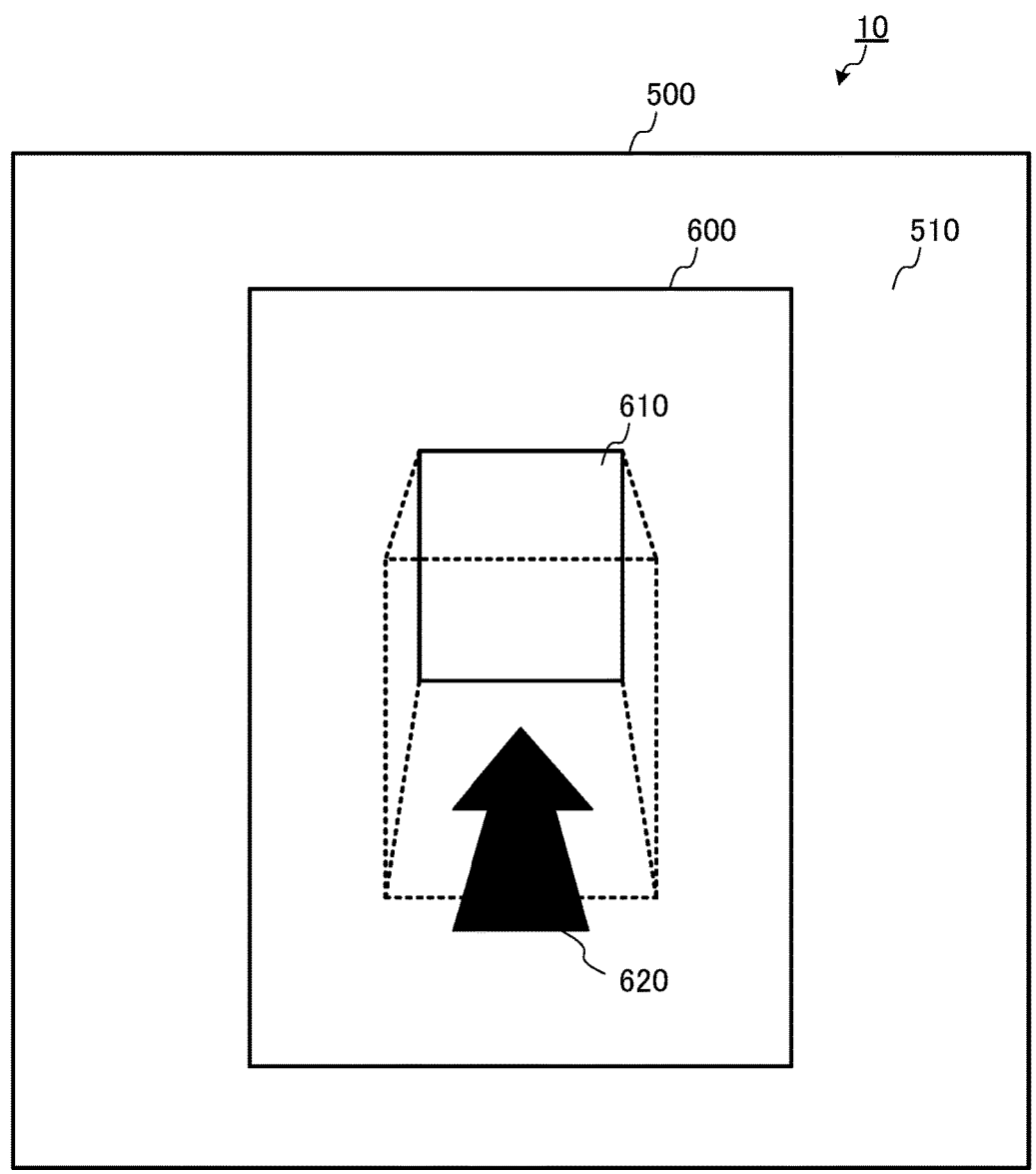

On the other hand, in step S19, if judging that the input receiver module 32 has received an input of the work instruction in the solid 610 (YES), the arrow icon display module 33 displays the arrow icon 620 on the remote instruction screen shown in FIG. 7 based on the input work instruction (step S20). In step S20, the arrow icon display module 33 displays on the remote instruction screen as arrow icon 620 that can recognize the beginning point, the end point, and the direction based on the input work instruction. In step S20, the arrow icon display module 33 recognizes the point where the input was received as a beginning point of the arrow. Moreover, in step S20, the arrow icon display module 33 recognizes the point where the input was terminated as an end point of the arrow. In step S20, the arrow icon display module 33 recognizes the direction starting from the beginning point of the input and terminating at the end point of the input as a direction of the arrow. The arrow icon display module 33 may recognize the beginning point, the end point, and the direction of the arrow by other methods. For instance, when the arrow icon is dragged, the arrow icon display module 33 may recognize the beginning point of the arrow icon as a beginning point, the end point of the arrow icon as the end point, and the direction of the arrow icon as the direction to be displayed.

FIG. 7 is a remote instruction screen showing the state being input for the work instruction displayed on the instruction terminal 10. In FIG. 7, the arrow icon 620 is displayed in the solid display window 600. The arrow icon 620 is not limited to the shape of FIG. 7, and may be an icon with a shape other than the arrow, such as a triangular icon, and a polygonal icon. The arrow icon 620 can be changed as appropriate if the beginning point, the end point, and the direction can be recognized from its shape.

The data transfer module 21 transmits the arrow data indicating the arrow icon 620 to the remote terminal 100 (step S21).

The data transfer module 161 receives the arrow data transmitted from the instruction terminal 10. The arrow location estimate module 173 estimates the location of the received arrow data based on its own location information stored in step S15 (step S22). In step S22, the GPS acquisition module 170 may acquire and store its own location information.

In step S22, the arrow location estimate module 173 decides the beginning point of the arrow data as its own location information. The arrow location estimate module 173 estimates and decides the end point of the arrow data based on the beginning point of the decided arrow data. The arrow location estimate module 173 estimates and decides the direction of the arrow data based on the beginning point and end point of the decided arrow data.

The data storing module 190 associates and stores the end point of the arrow data estimated in step S21 with its own location information (step S23).

The movement judging module 175 judges whether or not the worker should move based on the beginning point, the end point, and the direction of the decided arrow data (step S24). In step S24, the movement judging module 175 judges whether or not the worker should move by judging whether or not the distance between the end point and its own location information is longer than the predetermined distance. In step S24, if judging that the worker need not move (NO), the movement judging module 175 displays the remote instructed screen shown in FIG. 8 (step S25).

Figure 8:
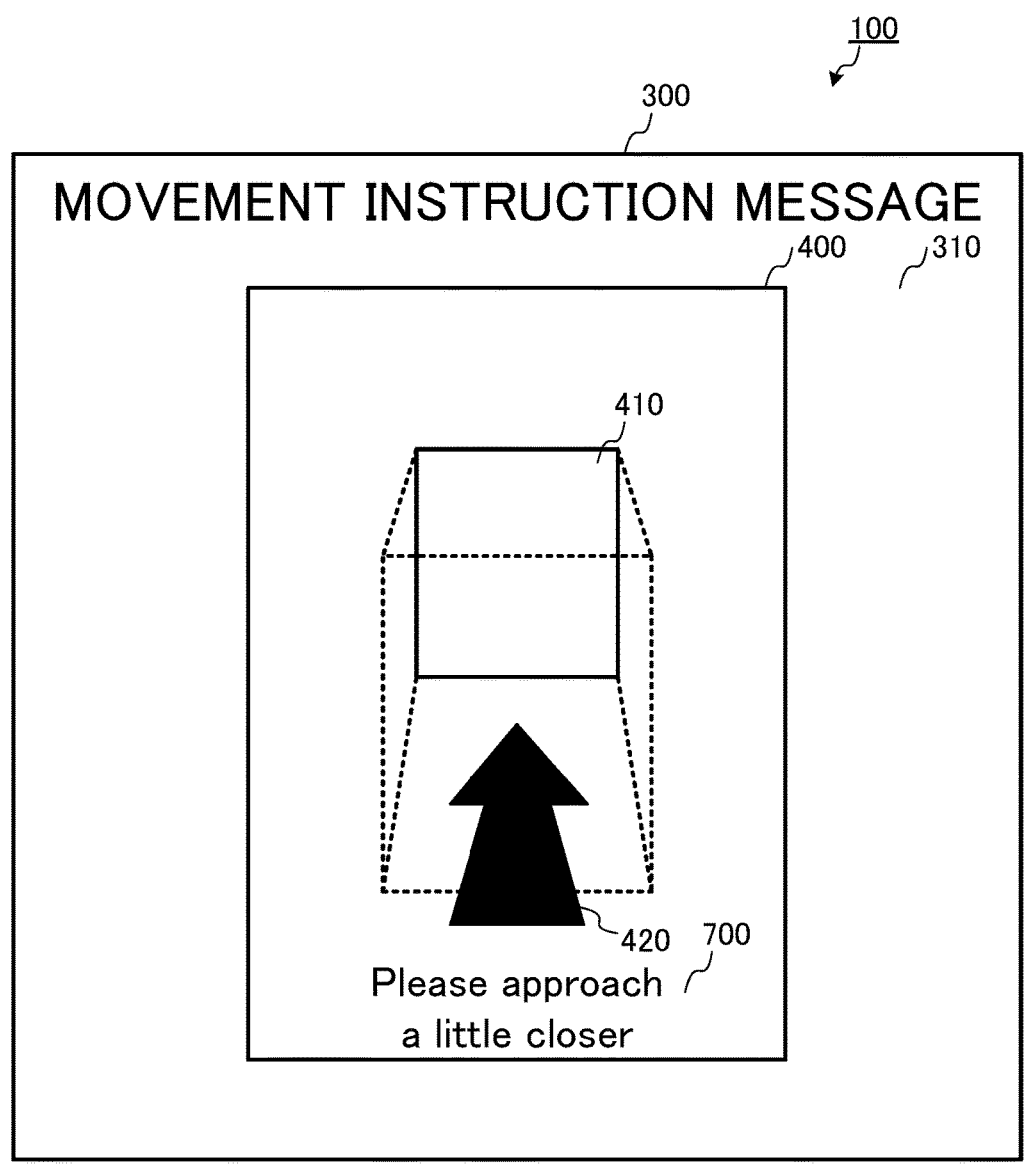

FIG. 8 shows the remote instructed screen displayed on the remote terminal 100. In FIG. 8, the arrow icon display module 174 may display the arrow icon 420 in addition to the image 310 and the solid 410 shown in FIG. 6. The arrow icon 420 is placed on top of the solid 410. In FIG. 8, the character display module 176 displays the message 700 instructing the action of the worker based on the arrow icon 420. The arrow icon 420 is displayed based on the beginning point, the end point, and the direction. For the message 700, the arrow icon display module 174 may receive the instruction input by the instructor with a voice input and a character input and may display the received instruction as a message.

Figure 9:
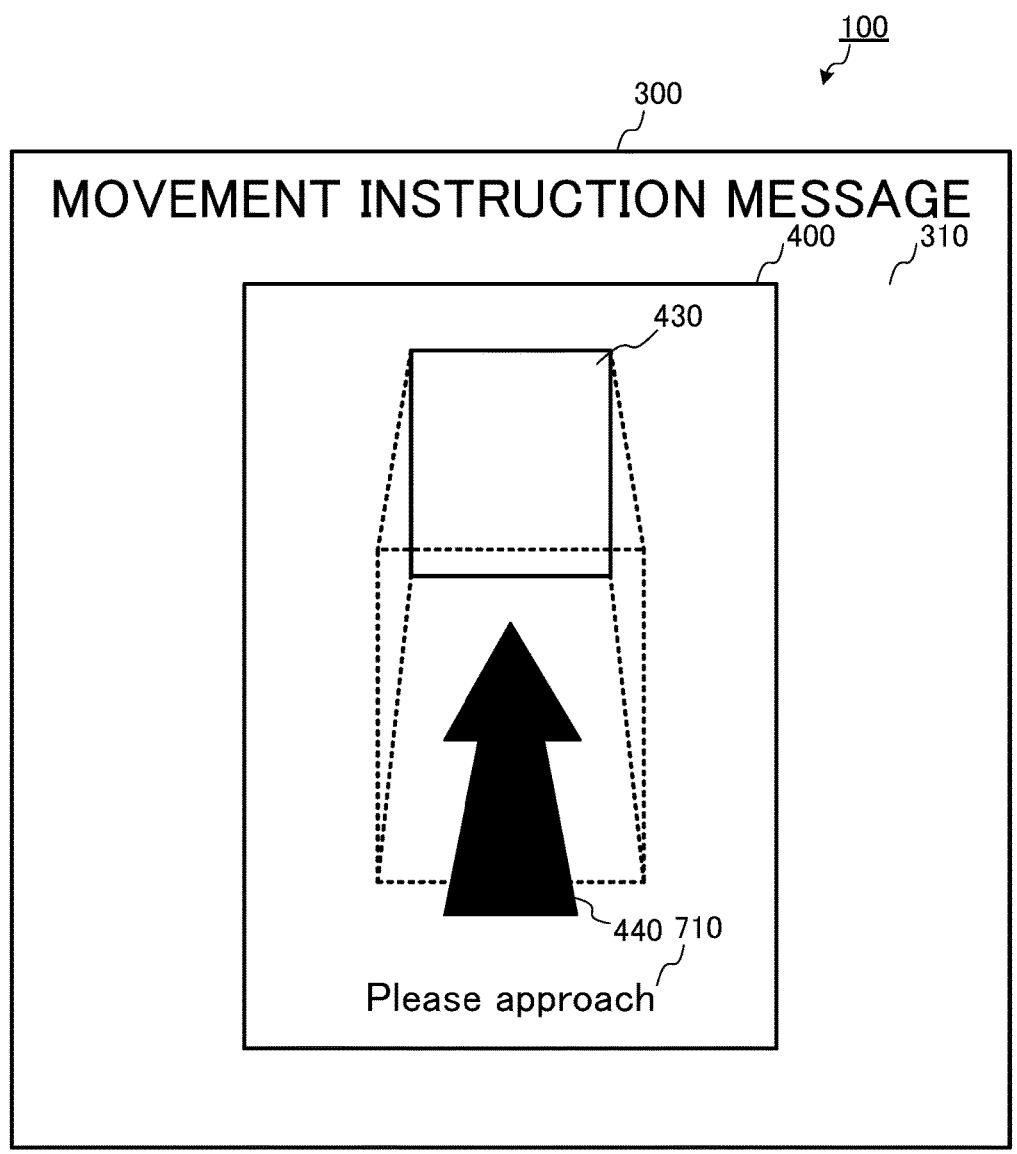

On the other hand, in step S24, if judging that the worker should move (YES), the movement judging module 175 displays the remote instructed screen shown in FIG. 9 (step S26).

FIG. 9 shows the remote instructed screen displayed on the remote terminal 100. In FIG. 9, the image 310 shown in FIG. 6 is displayed in the same way as FIG. 8. The solid display module 172 displays the solid 430 in the solid display window 400. The solid 430 has a cuboid shape, and the length of a side parallel to the direction instructing the movement is longer than the length of other side not parallel to the direction instructing the movement. Moreover, the arrow icon display module 174 places and displays the arrow icon 440 on top of the solid 430. For the arrow icon 440, the length of a side parallel to the direction instructing the movement is longer than the length of other side not parallel to the direction instructing the movement. In FIG. 9, the character display module 176 displays the message 710 instructing the action of the worker based on the arrow icon 440. The arrow icon 440 is displayed based on the beginning point, the end point, and the direction. For the message 710, the character display module 176 may receive the instruction input by the instructor with a voice input and a character input and may display the received instruction as a message.

The imaging module 180 judges whether or not the imaging module 180 has received an instruction to take an image of a working area (step S27). In step S27, if judging that the imaging module 180 has not received an instruction to take an image of a working area (NO), the imaging module 180 repeats the process until receiving an instruction to take an image.

On the other hand, if judging that the imaging module 180 has received an instruction to take an image of a working area (YES), the imaging module 180 takes an image of a working area (step S28).

The image recognition module 177 performs the image recognition of the image, and judges whether or not there is any change between the image taken in step S13 and the image taken this time (step S29). In step S29, the image recognition module 177 may extract the feature amount of the previous image and the latest image respectively and judge if there is any change between the images based on whether the extracted feature amount is matched or not.

In step S29, if judging that there is no change between the images (NO), the image recognition module 177 judges whether or not the image recognition module 177 has received an instruction to take an image of a working area.

On the other hand, if the image recognition module 177 judges that there is a change between the images (YES), the GPS acquisition module 170 acquires current location information (step S30).

Figure 10:
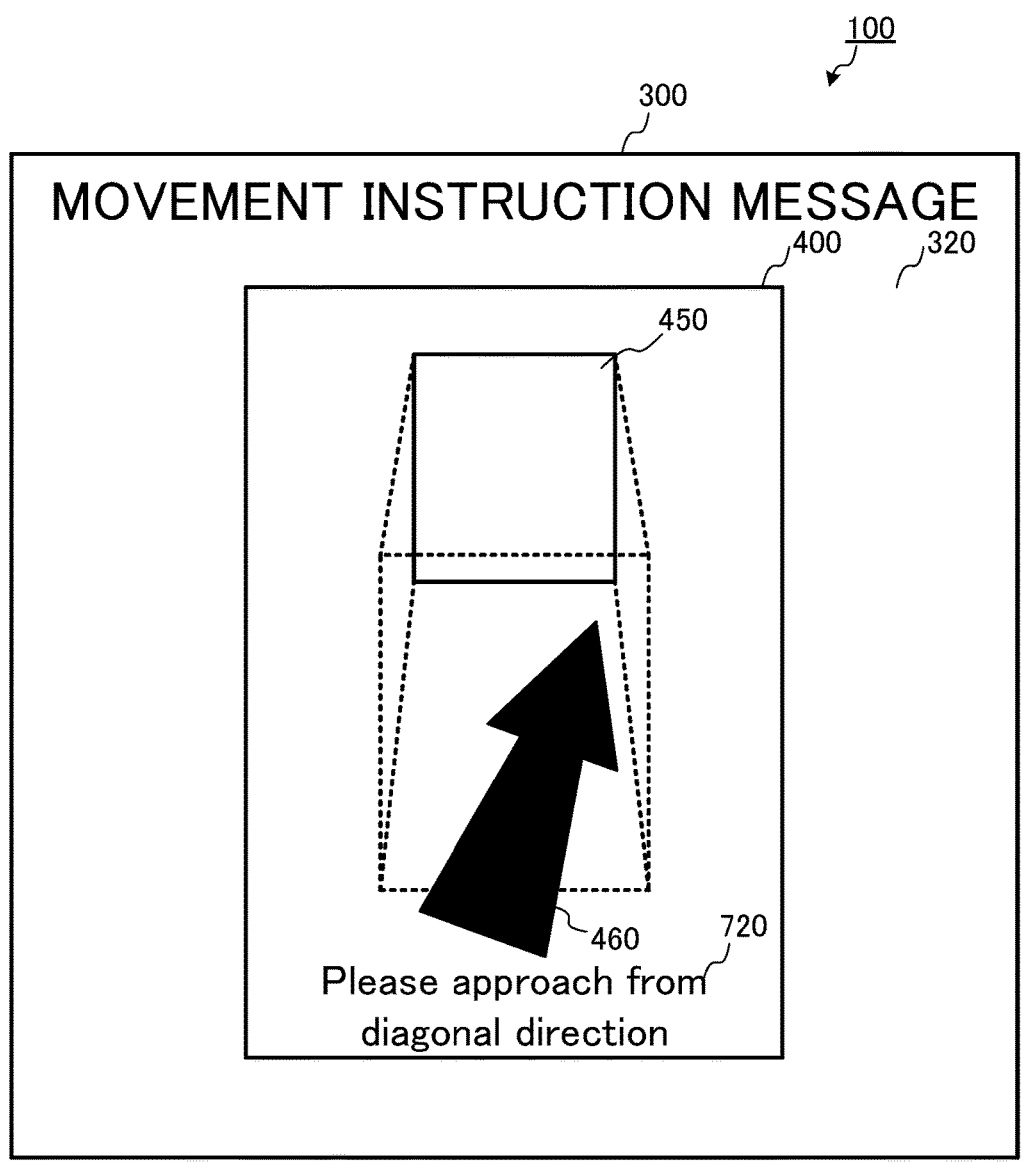

The arrow icon display module 174 changes the direction of the arrow based on the location information acquired in step S30 and the location information of the end point of the arrow data stored in step S23, and displays the remote instructed screen shown in FIG. 10 (step S31). In step S31, the arrow icon display module 174 estimates the beginning point as its own location information acquired this time, estimates the end point as a location information of the stored arrow data, and estimates the direction of the arrow icon based on the beginning point and end point, and finally displays the arrow icon based on the estimated beginning point, the estimated end point, and the estimated direction of the arrow icon.

FIG. 10 shows the remote instructed screen displayed on the remote terminal 100. In FIG. 10, the image 320 taken in step S27 is displayed in the same way as FIG. 9. The solid display module 172 displays the solid 450 in the solid display window 400. For the solid 450, the length of a side parallel to the direction instructing the movement is longer than the length of other side not parallel to the direction instructing the movement in the same way as FIG. 9. Moreover, the arrow icon display module 174 places and displays the arrow icon 460 on top of the solid 450. For the arrow icon 460, the length of a side parallel to the direction instructing the movement is longer than the length of other side not parallel to the direction instructing the movement in the same way as FIG. 10. The character display module 176 displays the message 720 instructing the action of the worker based on the arrow icon 460 displayed based on the beginning point, the end point, and the direction. For the message 720, the character display module 176 may receive the instruction input by the instructor with a voice input and a character input and may display the received instruction as a message.

In the embodiment mentioned above, it is explained a case where the movement is instructed by the arrow icon but the rotation also may be instructed by the arrow icon. In this case, the arrow icon has to be curved in the direction the worker should turn.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the recording medium, forwards and stores the program to and in an internal or an external storage, and executes it. The program may be previously recorded in, for example, storage (record medium) such as a magnetic disk, an optical disk, or a magnetic optical disk and provided from the storage to a computer through a communication line.

The embodiments of the present invention are described above. However, the present invention is not limited to these embodiments. The effect described in the embodiments of the present invention is only the most preferable effect produced from the present invention. The effects of the present invention are not limited to that described in the embodiments of the present invention.

REFERENCE SIGNS LIST

1 Remote instruction system
10 Instruction terminal
100 Remote terminal

What is claimed is:

1. A remote terminal receiving an instruction from an instruction terminal while sharing a screen, comprising:
an imaging device that takes an image of a target area;
a communication device;
a display device;
a processor that:
transmits the taken image of the target area to the instruction terminal via the communication device;
displays on the display device of the remote terminal a three dimensional shape to understand three dimensional space of the taken image;
receives instruction data indicating an instruction icon from the instruction terminal, a beginning point and end point of the instruction icon on the instruction terminal being set by the instruction terminal;
estimates a location of the instruction icon based on location information of the remote terminal; and
displays on the display device of the remote terminal the instruction icon in addition to the displayed three dimensional shape based on the estimated location,
wherein the instruction icon instructs a user of the remote terminal to move or turn in the target area, and
wherein the processor decides a beginning point of the instruction icon on the remote terminal as the location information, estimates an end point of the instruction icon on the remote terminal based on the beginning point on the remote terminal and instruction data, and judges whether the user should move by judging whether a distance between the end point on the remote terminal and the location information is longer than a predetermined distance.

2. The remote terminal according to claim 1, wherein the instruction icon displayed by the icon display unit is an arrow icon that instructs the user of the remote terminal to move or turn in the target area.

3. The remote terminal according to claim 1, wherein the instruction icon displayed by the icon display unit is an arrow icon that instructs the user of the remote terminal to move or turn in the target area, and
wherein the processor associates and stores the location information with the end point on the remote terminal.

4. The remote terminal according to claim 1, wherein the displayed three dimensional shape is not changed according to the instruction icon.

5. A method of providing remote instruction by receiving an instruction from an instruction terminal while sharing a screen, comprising the steps of:
taking, by a remote terminal, an image of a target area;
transmitting, by the remote terminal, the taken image of a target area to the instruction terminal;
displaying, by the remote terminal, a three dimensional shape to understand three dimensional space of the taken image;
receiving, by the remote terminal, instruction data indicating an instruction icon from the instruction terminal, a beginning point and end point of the instruction icon on the instruction terminal being set by the instruction terminal;
estimating, by the remote terminal, a location of the instruction icon based on location information of the remote terminal; and
displaying, by the remote terminal, the instruction icon in addition to the displayed three dimensional shape based on the estimated location,
wherein the instruction icon instructs a user of the remote terminal to move or turn in the target area, and
wherein the method further comprises deciding a beginning point of the instruction icon on the remote terminal as the location information, estimating an end point of the instruction icon on the remote terminal based on the beginning point on the remote terminal and instruction data, and judging whether the user should move by judging whether a distance between the end point on the remote terminal and the location information is longer than a predetermined distance.

6. The method according to claim 5, further comprising: associating and storing, by the remote terminal, the location information with the end point.

7. The method according to claim 5, wherein the displayed three dimensional shape is not changed according to the instruction icon.

* * * * *